US011661181B2

(12) United States Patent
Ciet et al.

(10) Patent No.: US 11,661,181 B2
(45) Date of Patent: May 30, 2023

(54) AIRCRAFT HAVING SUPPORT STAYS FOR WINGS IN WHICH HYDROGEN PIPES OR ELECTRICAL CONDUCTORS ARE ARRANGED

(71) Applicant: Airbus Operations SAS, Toulouse (FR)

(72) Inventors: Olivier Ciet, Toulouse (FR); Pascal Pome, Toulouse (FR); Alistair Forbes, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 347 days.

(21) Appl. No.: 17/021,569

(22) Filed: Sep. 15, 2020

(65) Prior Publication Data

US 2021/0078702 A1    Mar. 18, 2021

(30) Foreign Application Priority Data

Sep. 16, 2019  (FR) ..................................... 1910174

(51) Int. Cl.
*B64D 37/30* (2006.01)
*B64C 1/00* (2006.01)
(Continued)

(52) U.S. Cl.
CPC .......... *B64C 29/0033* (2013.01); *B64D 27/24* (2013.01); *B64D 37/30* (2013.01); *B64C 2001/0027* (2013.01); *B64D 2041/005* (2013.01); *B64U 30/10* (2023.01); *B64U 50/13* (2023.01); *B64U 50/19* (2023.01)

(58) Field of Classification Search
CPC .... B64D 37/30; B64D 2041/005; B64C 1/26; B64C 3/34; B64C 2201/06
See application file for complete search history.

(56) References Cited

U.S. PATENT DOCUMENTS 2,507,069 A      5/1950  Vincent
2,557,438 A  *   6/1951  Johnson ................. B64D 37/20
                                                        137/565.17

(Continued)

OTHER PUBLICATIONS

French Search Report; priority document.

*Primary Examiner* — Richard Green
*Assistant Examiner* — Madison Elizabeth Dittner
(74) *Attorney, Agent, or Firm* — Greer, Burns & Crain, Ltd.

(57) ABSTRACT

An aircraft having a fuselage having a pressurized upper space above the floor and a lower space beneath the floor, a wing, a hollow support stay fixed between the lower space level of the fuselage and the wing, an electric motor propeller propulsion system fixed beneath each wing, the output shaft of the motor driving a propeller in rotation, a production system having a fuel cell producing electrical energy supplying the electric motor with electricity via electrical conductors, a hydrogen reservoir fixed in the lower space, and a hydrogen inlet pipe feeding hydrogen from a hydrogen reservoir to the production system, wherein the hydrogen inlet pipe extends through the interior of the support stay. The electrical conductors or the hydrogen pipes pass through the stays on the outside of the fuselage and therefore at a distance from the passengers and the electronic systems of the aircraft.

1 Claim, 3 Drawing Sheets

(51) Int. Cl.
*B64D 41/00* (2006.01)
*B64U 30/10* (2023.01)
*B64U 50/13* (2023.01)
*B64U 50/19* (2023.01)
*B64C 29/00* (2006.01)
*B64D 27/24* (2006.01)

(56) References Cited

U.S. PATENT DOCUMENTS

| | | | | |
|---|---|---|---|---|
| 7,281,681 | B2* | 10/2007 | MacCready | B64C 39/024 |
| | | | | 244/59 |
| 7,555,893 | B2* | 7/2009 | Okai | F02K 3/06 |
| | | | | 60/228 |
| 7,648,103 | B2* | 1/2010 | Barbosa | B64C 17/10 |
| | | | | 220/4.15 |
| 10,597,136 | B2* | 3/2020 | Genty De La Sagne | |
| | | | | B64D 29/02 |
| 10,774,741 | B2* | 9/2020 | Sennoun | F02C 6/00 |
| 11,365,012 | B2* | 6/2022 | Rainville | H01M 8/04395 |
| 2014/0339367 | A1 | 11/2014 | Sankrithi et al. | |
| 2017/0327219 | A1 | 11/2017 | Alber | |
| 2021/0269152 | A1* | 9/2021 | Wankewycz | H01M 10/46 |

* cited by examiner

AIRCRAFT HAVING SUPPORT STAYS FOR WINGS IN WHICH HYDROGEN PIPES OR ELECTRICAL CONDUCTORS ARE ARRANGED

CROSS-REFERENCES TO RELATED APPLICATIONS

This application claims the benefit of the French patent application No. 1910174 filed on Sep. 16, 2019, the entire disclosures of which are incorporated herein by way of reference.

FIELD OF THE INVENTION

The present invention relates to an aircraft having support stays for wings in which hydrogen pipes or electrical conductors that supply propulsion systems are arranged.

BACKGROUND OF THE INVENTION

An aircraft conventionally has a fuselage that has a passenger area that is situated inside the fuselage, where the passengers are located.

In order to move, the aircraft has propulsion systems, each of which has, for example, an electric motor and a propeller. The motor generates a rotary movement that is transmitted to the propeller.

In order to supply the electric motor, it is known to use fuel cells, and in order to supply each fuel cell, the aircraft has hydrogen reservoirs.

According to a first arrangement, the reservoirs are disposed above the fuselage and the fuel cells are disposed at the level of the electric motors.

In order to supply the fuel cells, the aircraft then has gas pipes that extend between the hydrogen reservoir and the fuel cells, and the gas pipes extend at the level of the ceiling of the fuselage, as close as possible to the passenger area.

In order to avoid any risk of the interior of the passenger area being contaminated with hydrogen in the event of one of the gas pipes leaking, it is necessary to add protection for the pipe, this bringing about an increase in the weight and cost of the aircraft.

According to another arrangement, the hydrogen reservoirs and the fuel cells are disposed above the fuselage.

In order to supply the electric motors, the aircraft then has electrical conductors that extend between the fuel cells and the electric motors, and the electrical conductors extend at the level of the ceiling of the fuselage.

With such an arrangement, it is necessary to add shielding in order to prevent the electronic systems of the aircraft and the passengers being subjected to electromagnetic disturbances. This brings about an increase in the weight and cost of the aircraft.

It is therefore necessary to find an arrangement that makes it possible to position the gas pipes and the electrical conductors in some other way, in order to move them away from the passenger area.

SUMMARY OF THE INVENTION

It is an object of the present invention to propose an aircraft having support stays for wings in which hydrogen pipes or electrical conductors that supply propulsion systems are arranged.

To that end, an aircraft is proposed, having:

- a fuselage having a structure, fuselage panels that are fixed to the structure and delimit an interior volume, and a floor that divides the interior volume into a pressurized upper space above the floor and a lower space beneath the floor,
- on either side of the fuselage, a wing with a chassis fixed to the structure,
- for each wing, a support stay that is hollow and is fixed between the structure of the fuselage at the level of the lower space and the chassis of the wing,
- at least one propulsion system fixed to each wing,
- at least one energy source situated in the lower space, said energy source comprising a hydrogen reservoir fixed to the structure in the lower space, and
- for each wing, at least one energy transport means configured to feed energy from the energy source to the propulsion system, wherein said at least one energy transport means extends through the interior of the support stay.

With such arrangements, the electrical conductors or the hydrogen pipes pass through the stays that are on the outside of the fuselage and therefore at a distance from the passengers and the electronic systems of the aircraft.

According to one particular embodiment, each propulsion system is a propeller propulsion system that is fixed to each wing and has an electric motor, the output shaft of which drives a propeller in rotation, and the aircraft also has at least one production system that has a fuel cell that produces electrical energy.

Advantageously, the at least one production system supplies the electric motor of each propeller propulsion system with electricity by way of electrical conductors, wherein each production system is disposed at the level of the wing or of the at least one propulsion system, and the at least one energy transport means comprises a hydrogen inlet pipe that feeds the hydrogen from the hydrogen reservoir of the energy source to the production system.

Advantageously, the at least one energy transport means comprises electrical conductors, and the energy source comprises the at least one production system that supplies the electric motor of each propeller propulsion system with electricity by way of the electrical conductors, wherein each production system is disposed in the lower space and wherein, for each production system, a hydrogen inlet pipe feeds the hydrogen from a hydrogen reservoir to the production system.

According to another particular embodiment, each propulsion system is an internal combustion propulsion system fixed to each wing, and the at least one energy transport means comprises a hydrogen inlet pipe that feeds the hydrogen from the hydrogen reservoir of the energy source to the internal combustion propulsion system.

Advantageously, the aircraft has at least one additional hydrogen reservoir, wherein each additional hydrogen reservoir is fixed to the chassis of the wing, the hydrogen inlet pipe has an upstream part that extends from the hydrogen reservoir and a downstream part that extends from the propeller propulsion system, the aircraft has an upstream secondary pipe, a downstream secondary pipe hydraulically connected to the additional hydrogen reservoir, a secondary hydrogen inlet pipe feeding the hydrogen to the production system, a first three-way valve, a second three-way valve, and a control unit that controls the positioning of the first three-way valve and the positioning of the second three-way valve, wherein a first port of the first three-way valve is hydraulically connected to the upstream part, a second port of the first three-way valve is hydraulically connected to the downstream part and a third port of the first three-way valve is hydraulically connected to the upstream secondary pipe, and wherein a first port of the second three-way valve is hydraulically connected to the upstream secondary pipe, a second port of the second three-way valve is hydraulically connected to the downstream secondary pipe and a third port of the second three-way valve is hydraulically connected to the secondary hydrogen inlet pipe.

Advantageously, the aircraft has at least one additional hydrogen reservoir, wherein each additional hydrogen reservoir is fixed to the chassis of the wing, the hydrogen inlet pipe has an upstream part that extends from the hydrogen reservoir and a downstream part that extends from the internal combustion propulsion system, the aircraft has a secondary pipe hydraulically connected to the additional hydrogen reservoir, a three-way valve, and a control unit that controls the positioning of the three-way valve, wherein a first port of the three-way valve is hydraulically connected to the upstream part, a second port of the three-way valve is hydraulically connected to the downstream part and a third port of the three-way valve is hydraulically connected to the secondary pipe.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
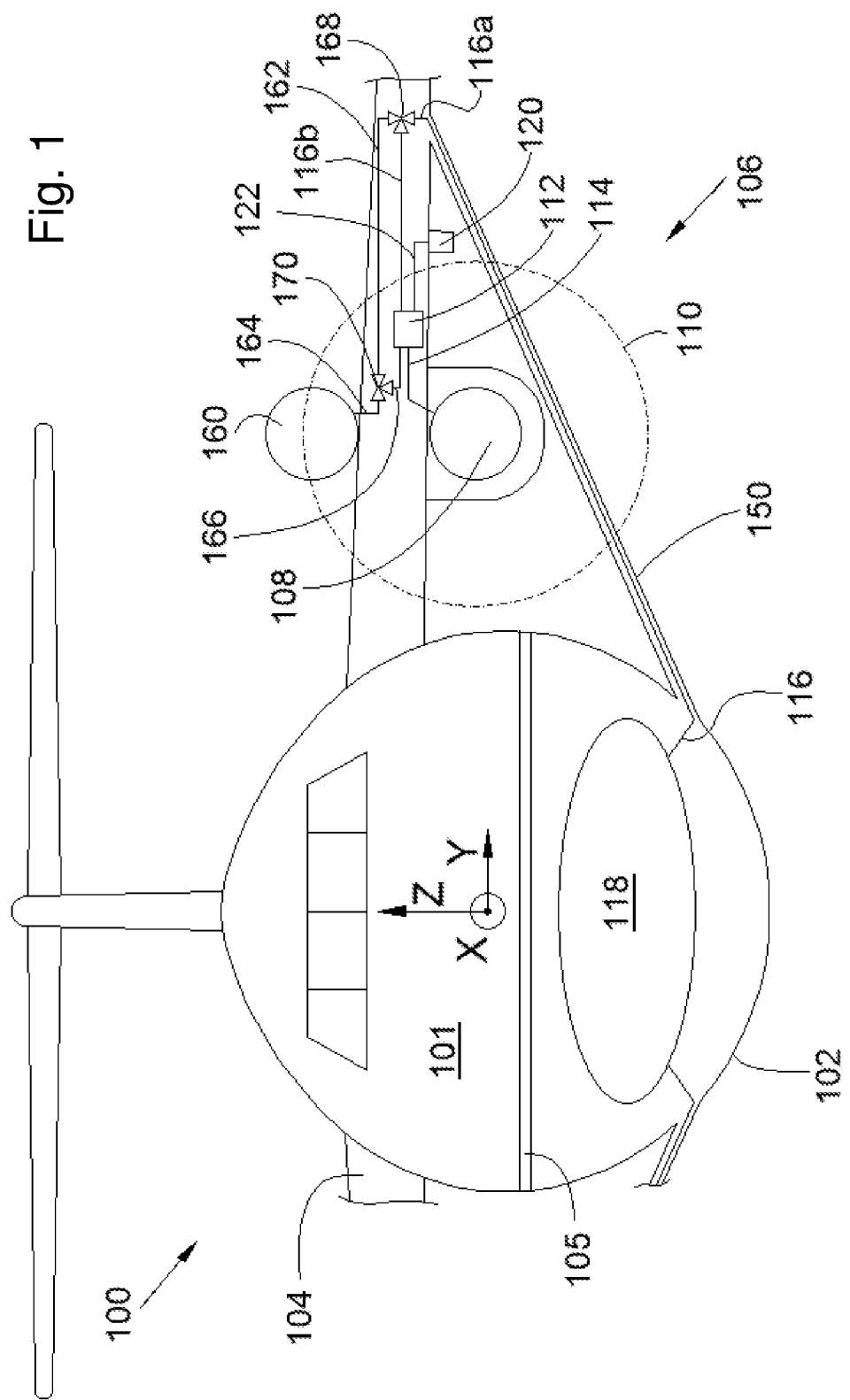
FIG. 1 shows a front view of an aircraft according to a first embodiment of the invention.
Figure 2:
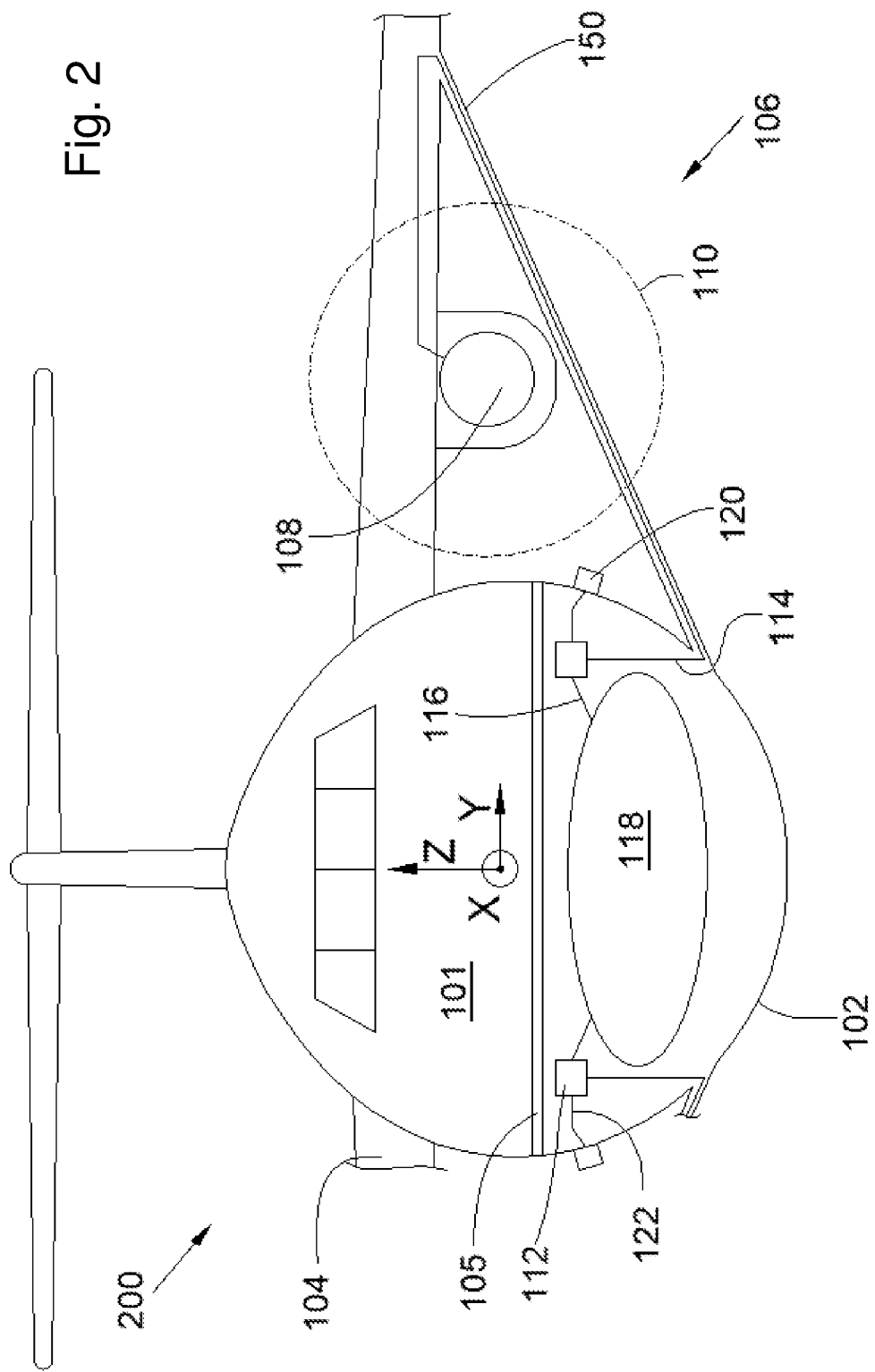
FIG. 2 shows a front view of an aircraft according to a second embodiment of the invention.
Figure 3:
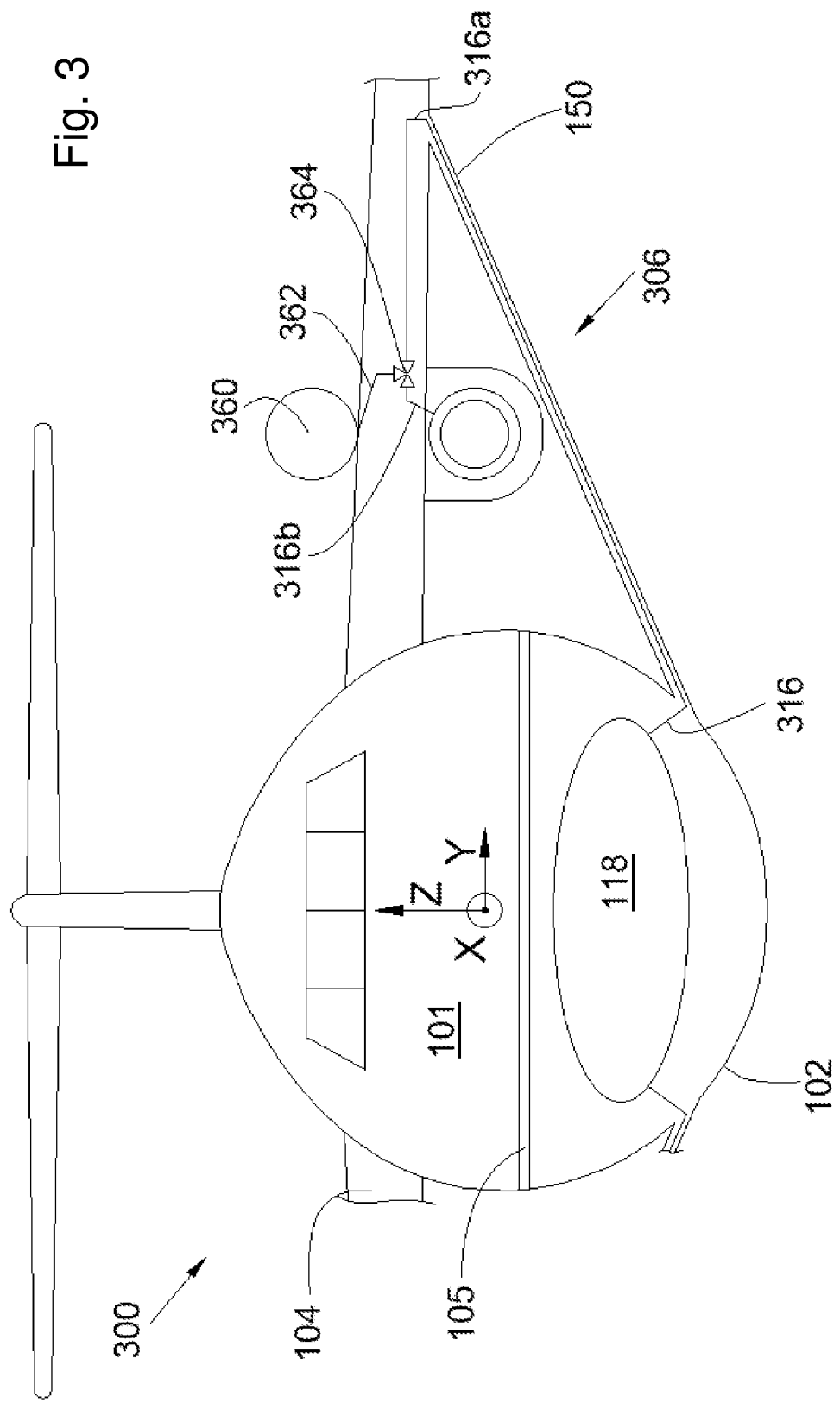
FIG. 3 shows a front view of an aircraft according to a third embodiment of the invention.

FIG. 1 shows an aircraft 100 according to a first embodiment of the invention, FIG. 2 shows an aircraft 200 according to a second embodiment of the invention, and FIG. 3 shows an aircraft 300 according to a third embodiment of the invention.

The aircraft 100, 200, 300 has a fuselage 102 having a structure and fuselage panels that are fixed to the structure and delimit an interior volume 101 inside the fuselage 102.

In the following description, and by convention, the X direction is the longitudinal direction of aircraft, with positive orientation in the direction of forward movement of the aircraft, the Y direction is the transverse direction of the aircraft, which is horizontal when the aircraft is on the ground, and the Z direction is the vertical direction or vertical height when the aircraft is on the ground, these three directions X, Y and Z being mutually orthogonal. The XZ plane is the plane of vertical symmetry of the aircraft.

The aircraft 100, 200, 300 also has a floor 105 that divides the interior volume 101 into a pressurized upper space above the floor 105 and a lower space beneath the floor 105, which is furthermore fixed to the structure.

The pressurized upper space constitutes a passenger area and the lower space may be pressurized or unpressurized and constitutes a cargo area.

On either side of the fuselage 102, the aircraft 100, 200, 300 has a wing 104 with a chassis fixed to the structure.

In each of the embodiments presented in FIGS. 1 to 3, the aircraft 100, 200, 300 has at least one energy source situated in the lower space, wherein the energy source comprises at least one hydrogen reservoir 118 fixed to the structure of the fuselage 102 in the lower space.

In each of the embodiments described here, there is one hydrogen reservoir 118, but it is possible to provide a different arrangement with one starboard-side reservoir and one port-side reservoir or a plurality of hydrogen reservoirs, wherein all the hydrogen reservoirs are aligned in a direction parallel to the longitudinal direction, one behind another.

Each hydrogen reservoir 118 in this case takes the form of a cylinder with an elliptical section, the axis of which is parallel to the longitudinal direction X, but it is possible to provide a different section, for example a circular section.

For each wing 104, the aircraft 100, 200, 300 has a support stay (or strut) 150 that is hollow and is fixed between the structure of the fuselage 102 and the chassis of the wing 104 in order to support the latter. To this end, the support stay 150 has a first end fixed to the structure at the level of the lower space, and a second end fixed to the chassis of the wing 104. Such a support stay 150 is thus arranged outside the fuselage 102, and extends from a bottom part of the fuselage 102 as far as the wing 104.

In each embodiment, the aircraft 100, 200, 300 has at least one propulsion system 106, 306 fixed to each wing 104, in particular, beneath the wing 104. In the embodiments in FIGS. 1 and 2, each propulsion system 106 is a propeller propulsion system 106 and in the embodiment in FIG. 3, each propulsion system 306 is an internal combustion propulsion system 306 that takes the form of an internal combustion engine supplied with hydrogen.

For each wing 104, the aircraft 100, 200, 300 has at least one energy transport means 116, 114, 316 configured to feed energy from the energy source to the propulsion system 106, 306, wherein the at least one energy transport means 116, 114, 316 extends through the interior of the support stay 150. Thus, each energy transport means 116, 114, 316 is remote from the pressurized upper space.

Each propeller propulsion system 106 has an electric motor 108, the output shaft of which drives a propeller 110 in rotation.

The aircraft 100, 200 also has at least one production system 112 having at least one fuel cell that produces electrical energy for supplying the electric motor 108 of each propeller propulsion system 106 with electricity by means of electrical conductors 114 that extend between a production system 112 and a propeller propulsion system 106.

The fuel cell is a cell in which an electric voltage is generated by virtue of the oxidation of a reducing fuel, in this case hydrogen, on one electrode, combined with the reduction of an oxidant, in this case oxygen, and more particularly in this case, oxygen from the air, on the other electrode.

In the embodiment in FIG. 1, the production system 112 is disposed at the level of the wing 104 on the outside of the propeller propulsion system 106, but it could be disposed at the level of the wing 104 on the inside of the propeller propulsion system 106.

In the embodiment in FIG. 2, each production system 112 is disposed in the lower space.

In the embodiments in FIGS. 1 and 2, in order to supply each production system 112, the aircraft 100, 200 has, for each production system 112, a hydrogen inlet pipe 116 that feeds the hydrogen from a hydrogen reservoir 118 to the production system 112 and the associated fuel cells, and an oxygen inlet pipe 122 that feeds the oxygen from an oxygen source 120 to the production system 112 and the associated fuel cells.

For each hydrogen inlet pipe 116, the aircraft 100 has a pump that drives the hydrogen in movement into the hydrogen inlet pipe 116; typically, the pump is at the outlet of the hydrogen reservoir.

The hydrogen inlet pipe 116 is hydraulically connected between a hydrogen reservoir 118 and the production system 112.

The oxygen inlet pipe 122 is hydraulically connected between an oxygen source 120 and the production system 112. The oxygen source 120 is, for example, a scoop 120 on the outer skin of the aircraft 100 or an oxygen reservoir.

In the embodiment of the invention in FIG. 1, the hydrogen inlet pipe 116 extends through the interior of the support stay 150 so as to meet the wing 104. The hydrogen inlet pipe 116 is thus remote from the pressurized upper space. In this embodiment, each energy transport means comprises a hydrogen inlet pipe 116, which feeds the hydrogen from the hydrogen reservoir 118 of the energy source to the production system 112.

In the embodiment of the invention in FIG. 2, each energy transport means comprises the electrical conductors 114, which extend through the interior of the support stay 150 so as to meet the wing 104. The electrical conductors 114 are thus remote from the pressurized upper space. In this embodiment, the energy source comprises the at least one production system 112 that supplies the electric motor 108 of each propeller propulsion system 106 with electricity by way of the electrical conductors 114.

In the embodiment in FIG. 3, the aircraft 300 has, beneath each wing 104, at least one internal combustion propulsion system 306, which takes the form of an internal combustion engine supplied with hydrogen. This engine may be a jet engine or a turboprop engine.

Each internal combustion propulsion system 306 burns hydrogen in order to generate the propulsive force necessary for the aircraft 300.

In order to supply each internal combustion propulsion system 306, the aircraft 300 has, for each internal combustion propulsion system 306, a hydrogen inlet pipe 316 that feeds the hydrogen from a hydrogen reservoir 118 to the internal combustion propulsion system 306. Thus, in this embodiment, the at least one energy transport means comprises a hydrogen inlet pipe 316, which feeds the hydrogen from the hydrogen reservoir 118 of the energy source to the internal combustion propulsion system 306.

For each hydrogen inlet pipe 316, the aircraft 100 has a pump that drives the hydrogen in movement into the hydrogen inlet pipe 316; typically, the pump is at the outlet of the hydrogen reservoir.

The hydrogen inlet pipe 316 is hydraulically connected between a hydrogen reservoir 118 and the internal combustion propulsion system 306.

In the embodiment of the invention in FIG. 3, the hydrogen inlet pipe 316 extends through the interior of the support stay 150 so as to meet the wing 104. The hydrogen inlet pipe 316 is thus remote from the pressurized upper space.

In each of the three embodiments presented in FIGS. 1 to 3, the stream of potentially disturbing element, be it hydrogen or electricity, is thus remote from the pressurized upper space in which the passengers and the electronic systems of the aircraft are housed.

In the embodiments in FIGS. 1 and 3, the aircraft 100, 300 may also have at least one additional hydrogen reservoir 160, 360, wherein each additional hydrogen reservoir 160, 360 is fixed to the chassis of the wing 104 or to the propulsion system 106, 306. In the embodiments in FIGS. 1 and 3, the additional hydrogen reservoir 160, 360 is fixed above the wing 104, but it may be integrated inside the wing 104, or even inside the propulsion system 106, 306.

Such additional hydrogen reservoirs 160, 360 may be filled before takeoff so as to have an increased fuel capacity.

In flight, such additional hydrogen reservoirs 160, 360 may also act as buffer reservoirs so as to limit the transfer of hydrogen into the hydrogen inlet pipe 116, 316. In the latter case, the additional hydrogen reservoir 160, 360 is filled with hydrogen from the hydrogen reservoir 118 and, when it is full, the hydrogen that supplies the production system 112 or the internal combustion propulsion system 306 is withdrawn from the additional hydrogen reservoir 160, 360, until the level of hydrogen in the additional hydrogen reservoir 160, 360 reaches a lower limit, at which it is then filled again from the hydrogen reservoir 118.

The aircraft 100, 300 has a pump that drives the hydrogen in movement from the additional hydrogen reservoir 160, 360 into the hydrogen inlet pipe 116, 316; typically the pump is at the outlet of the additional hydrogen reservoir 160, 360.

In the embodiment in FIG. 1, the aircraft 100 has an upstream secondary pipe 162, a downstream secondary pipe 164, a secondary hydrogen inlet pipe 166, a first three-way valve 168 and a second three-way valve 170.

The downstream secondary pipe 164 is hydraulically connected to the additional hydrogen reservoir 160.

The secondary hydrogen inlet pipe 166 feeds the hydrogen to the production system 112 and the associated fuel cells.

In this embodiment, the hydrogen inlet pipe 116 has an upstream part 116a that extends from the hydrogen reservoir 118 and a downstream part 116b that extends from the propeller propulsion system 106, and the first three-way valve 168 is hydraulically connected between the upstream part 116a and the downstream part 116b.

A first port of the first three-way valve 168 is hydraulically connected to the upstream part 116a, a second port of the first three-way valve 168 is hydraulically connected to the downstream part 116b and a third port of the first three-way valve 168 is hydraulically connected to the upstream secondary pipe 162.

A first port of the second three-way valve 170 is hydraulically connected to the upstream secondary pipe 162, a second port of the second three-way valve 170 is hydraulically connected to the downstream secondary pipe 164 and a third port of the second three-way valve 170 is hydraulically connected to the secondary hydrogen inlet pipe 166.

The aircraft 100 also has a control unit that controls the positioning of the first three-way valve 168 and the positioning of the second three-way valve 170 depending on the requirements, by hydraulically connecting either the upstream part 116a with the downstream part 116b, or the upstream part 116a with the upstream secondary pipe 162 and the upstream secondary pipe 162 with the downstream secondary pipe 164, or the downstream secondary pipe 164 with the secondary hydrogen inlet pipe 166.

In the embodiment in FIG. 3, the aircraft 300 has a secondary pipe 362 that is hydraulically connected to the additional hydrogen reservoir 360, and a three-way valve 364.

In this embodiment, the hydrogen inlet pipe 316 has an upstream part 316a that extends from the hydrogen reservoir 118 and a downstream part 316b that extends from the internal combustion propulsion system 306, and the three-way valve 364 is hydraulically connected between the upstream part 316a and the downstream part 316b.

A first port of the three-way valve 364 is hydraulically connected to the upstream part 316a, a second port of the three-way valve 364 is hydraulically connected to the downstream part 316b and a third port of the three-way valve 364 is hydraulically connected to the secondary pipe 362.

The aircraft 300 also has a control unit, or controller, that controls the positioning of the three-way valve 364 depending on the requirements, by hydraulically connecting either the upstream part 316a with the downstream part 316b, or the upstream part 316a with the secondary pipe 362, or the secondary pipe 362 with the downstream part 316b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage having a structure,
   fuselage panels that are fixed to the structure and delimit an interior volume, and a floor that divides the interior volume into a pressurized upper space above the floor and a lower space beneath the floor,
   on either side of the fuselage, a wing with a chassis fixed to the structure,
   for each wing, a support stay that is hollow and is fixed between the structure of the fuselage at a level of the lower space and the chassis of the wing,
   at least one propulsion system fixed to each wing,
   at least one energy source situated in the lower space, said energy source comprising a hydrogen reservoir fixed to the structure in the lower space, and
   for each wing, at least one energy transport means configured to feed energy from the energy source to the propulsion system,
   wherein said at least one energy transport means extends through the interior of the support stay,
   wherein each propulsion system is a propeller propulsion system that is fixed to each wing and has an electric motor, an output shaft of which drives a propeller in rotation,
   wherein said aircraft also has at least one production system that has a fuel cell that produces electrical energy,
   wherein said at least one production system supplies the electric motor of each propeller propulsion system with electricity by way of electrical conductors,
   wherein each production system is disposed at the level of the wing or of said at least one propulsion system,
   wherein said at least one energy transport means comprises a hydrogen inlet pipe that feeds hydrogen from a hydrogen reservoir of the energy source to the production system
   wherein said aircraft has at least one additional hydrogen reservoir,
   wherein each additional hydrogen reservoir is fixed to the chassis of the wing,
   wherein the hydrogen inlet pipe has an upstream part that extends from the hydrogen reservoir and a downstream part that extends from the propeller propulsion system,
   wherein the aircraft has an upstream secondary pipe, a downstream secondary pipe hydraulically connected to the additional hydrogen reservoir, a secondary hydrogen inlet pipe feeding the hydrogen to the production system, a first three-way valve, a second three-way valve, and a controller that controls the positioning of the first three-way valve and the positioning of the second three-way valve, wherein a first port of the first three-way valve is hydraulically connected to the upstream part, a second port of the first three-way valve is hydraulically connected to the downstream part and a third port of the first three-way valve is hydraulically connected to the upstream secondary pipe, and
   wherein a first port of the second three-way valve is hydraulically connected to the upstream secondary pipe, a second port of the second three-way valve is hydraulically connected to the downstream secondary pipe and a third port of the second three-way valve is hydraulically connected to the secondary hydrogen inlet pipe.

* * * * *